US008603207B2

(12) United States Patent
Zhang et al.

(10) Patent No.: US 8,603,207 B2

(45) Date of Patent: Dec. 10, 2013

(54) ACOUSTIC CLEANING ASSEMBLY FOR USE IN POWER GENERATION SYSTEMS AND METHOD OF ASSEMBLING SAME

(75) Inventors: Tian Xuan Zhang, Overland Park, KS (US); David Michael Chapin, Overland Park, KS (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 13/090,894

(22) Filed: Apr. 20, 2011

(65) Prior Publication Data

US 2012/0266586 A1 Oct. 25, 2012

(51) Int. Cl.
*B01D 46/00* (2006.01)

(52) U.S. Cl.
USPC .................. 55/292; 134/1; 181/157; 181/159

(58) Field of Classification Search
USPC ............. 55/282–305, 341.1–341.7, 361–382, 55/385.1–385.8, DIG. 30; 95/273–287; 96/389, 424–429; 181/157–174; 60/311; 134/22.12, 42, 184
See application file for complete search history.

(56) References Cited

U.S. PATENT DOCUMENTS

| | | | | |
|---|---|---|---|---|
| 3,489,317 | A * | 1/1970 | Wright | 222/644 |
| 5,197,399 | A | 3/1993 | Mansour | |
| 5,211,704 | A | 5/1993 | Mansour | |
| 5,353,721 | A | 10/1994 | Mansour et al. | |
| 6,290,778 | B1 | 9/2001 | Zugibe | |
| 6,662,812 | B1 | 12/2003 | Hertz et al. | |
| 7,341,616 | B2 | 3/2008 | Taylor et al. | |
| 7,562,556 | B2 | 7/2009 | Johnston et al. | |
| 7,710,000 | B2 | 5/2010 | Hall et al. | |
| 2009/0252987 | A1 | 10/2009 | Greene, Jr. | |
| 2010/0304146 | A1 | 12/2010 | Krebs et al. | |
| 2011/0048251 | A1 | 3/2011 | Bardenshtein et al. | |

* cited by examiner

*Primary Examiner* — Duane Smith
*Assistant Examiner* — Thomas McKenzie
(74) *Attorney, Agent, or Firm* — Armstrong Teasdale LLP

(57) ABSTRACT

An acoustic cleaning assembly that includes a horn assembly and a generator body that is coupled to the horn assembly. The generator body includes an inner surface that at least partially defines an outlet plenum, and an opening that extends in flow communication between the horn assembly and the outlet plenum. An end cap is coupled to the generator body and includes an inner surface that at least partially defines an inlet plenum. A diaphragm is coupled between the generator body and the end cap. The diaphragm channels air from the inlet plenum to the outlet plenum to facilitate generating sound waves within the outlet plenum.

18 Claims, 9 Drawing Sheets

ACOUSTIC CLEANING ASSEMBLY FOR USE IN POWER GENERATION SYSTEMS AND METHOD OF ASSEMBLING SAME

BACKGROUND OF THE INVENTION

The subject matter described herein relates generally to turbine engines and, more particularly, to an acoustic cleaning assembly for use with power generation systems.

At least some known power generation systems includes a furnace and/or boiler to generate steam that is used in a steam turbine generator. During a typical combustion process within a furnace or boiler, for example, a flow of combustion gases, or flue gases, is produced. Known combustion gases contain combustion products including, but not limited to, carbon, fly ash, carbon dioxide, carbon monoxide, water, hydrogen, nitrogen, sulfur, chlorine, arsenic, selenium, and/or mercury.

At least some known power generation systems include a particulate collection device, such as a baghouse, for use in reducing an amount of combustion products within the flue gases. During operation, at least some known components of the power generation system, such as the baghouse, are subjected to deposits being formed thereon. The formation of such deposits in air treatment systems may adversely affect the operation of the components. For example, buildup on a surface of these components may cause treatment inefficiencies, pressure drops, and excessive outage time. Removing such deposits while the system remains online facilitates improving an efficiency and an availability of the system.

At least some known methods of online deposit removal include soot blowing and/or the use of acoustic horns. Generally, known methods, including soot blowing, may cause erosion to surfaces being cleaned. Moreover, at least some known acoustic horns require a supply of compressed air to actuate a vibrating diaphragm plate to generate sound waves for use in cleaning air treatment components. Often, in such acoustic cleaners, a relief valve is used to discharge pressurized air from the acoustic cleaner, and additional pressurized air is required to facilitate operation. However, the loss of pressurized air through the relief valve increases the cost of operating the acoustic cleaner by increasing an amount of pressurized air required to operate the acoustic cleaner.

BRIEF DESCRIPTION OF THE INVENTION

In one aspect, an acoustic cleaning assembly is provided. The acoustic cleaning assembly includes a horn assembly and a generator body that is coupled to the horn assembly. The generator body includes an inner surface that at least partially defines an outlet plenum, and an opening that extends in flow communication between the horn assembly and the outlet plenum. An end cap is coupled to the generator body and includes an inner surface that at least partially defines an inlet plenum. A diaphragm is coupled between the generator body and the end cap. The diaphragm channels air from the inlet plenum to the outlet plenum to facilitate generating sound waves within the outlet plenum.

In another aspect, a power generation system is provided. The power generation system includes a combustion assembly for generating combustion gases and a particulate filter assembly that is coupled to the combustion assembly for removing particulate from the combustion gases. At least one acoustic cleaning assembly is coupled to the particulate filter assembly to facilitate removing debris from the particulate filter assembly. The acoustic cleaning assembly includes a horn assembly and a generator body that is coupled to the horn assembly. The generator body includes an inner surface that at least partially defines an outlet plenum, and an opening that extends in flow communication between the horn assembly and the outlet plenum. An end cap is coupled to the generator body and includes an inner surface that at least partially defines an inlet plenum. A diaphragm is coupled between the generator body and the end cap. The diaphragm channels air from the inlet plenum to the outlet plenum to facilitate generating sound waves within the outlet plenum.

In yet another aspect, a method of assembling an acoustic cleaning assembly is provided. The method includes providing a horn assembly and coupling a generator body to the horn assembly. The generator body includes an inner surface that at least partially defines an outlet plenum, and an outlet opening that extends in flow communication between the horn assembly and the outlet plenum. An end cap is coupled to the generator body and includes an inner surface that at least partially defines an inlet plenum. A diaphragm is coupled between the generator body and the end cap. The diaphragm includes an upstream surface and an opposite downstream surface. The diaphragm is oriented to enable a flow of air to be channeled from the inlet plenum to the outlet plenum to facilitate generating sound waves within the outlet plenum.

DETAILED DESCRIPTION OF THE INVENTION

The exemplary methods and systems described herein overcome at least some disadvantages of known acoustic cleaning assemblies by providing a cleaning assembly that includes a sound generator that channels air from an inlet plenum to an outlet plenum across a diaphragm. Moreover, in the exemplary embodiment the diaphragm is positioned between the inlet and outlet plenums such that pressurized air is channeled across an outer surface of the diaphragm. In addition, a support assembly, positioned within the inlet plenum and/or the outlet plenum, and is coupled to the diaphragm to support the diaphragm within a cavity of the acoustic cleaning assembly.

Figure 1:
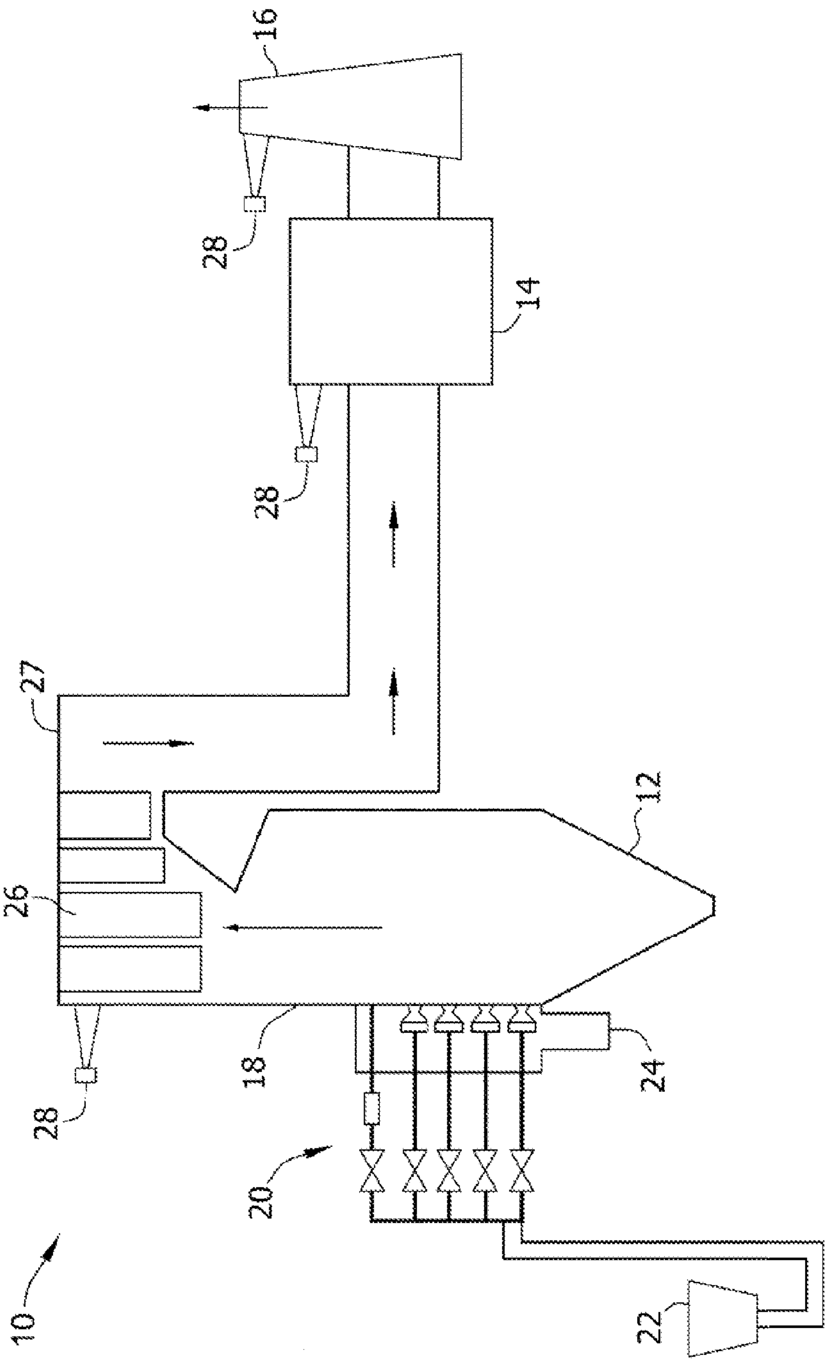
FIG. 1 is a schematic view of an exemplary power generation system.

FIG. 1 is a schematic view of an exemplary power generation system 10 that generally includes a furnace 12, a particulate filter assembly 14, and an exhaust stack 16. Specifically, in the exemplary embodiment, furnace 12 includes a combustion assembly 18 that includes a burner assembly 20 that is configured to supply a predetermined quantity of fuel from a fuel source 22 and a predetermined quantity of air from an air source 24. In the exemplary embodiment, fuel is coal supplied from a fuel source 22, such as, but not limited to being, a coal mill. Alternatively, system 10 may be supplied with any other suitable fuel, including but not limited to, oil, natural gas, biomass, waste, and/or any other fossil and/or renewable fuel that enables furnace 12 to function as described herein.

System 10 also includes a heat exchanger assembly 26 that is downstream from combustion assembly 18. In the exemplary embodiment, heat exchanger assembly 26 is configured to generate steam that is channeled to steam turbine (not shown) for use in generating power. Alternatively, heat exchanger assembly 26 may include a plurality of fuel cells (not shown) that may be electrically coupled to a power grid (not shown). A duct, or convective pass 27, extending downstream from heat exchanger assembly 26 is coupled in flow communication between furnace 12 and particulate filter assembly 14.

In the exemplary embodiment, particulate filter assembly 14 is a baghouse used to collect fly ash containing oxidized mercury and/or particulate-bound mercury. Alternatively, particulate filter assembly 14 may be an electrostatic precipitator, a cyclone, and/or any other device that collects mercury and/or other pollutants. Particulate filter assembly 14 is coupled in flow communication with stack 16 for filtering flue gas channeled from combustion assembly 18 to stack 16.

During operation of system 10, burner assembly 20 channels a predefined quantity of fuel and air into combustion assembly 18. Burner assembly 20 ignites the fuel/air mixture within combustion assembly 18 to create combustion or flue gases. Combustion assembly 18 channels the flue gases to heat exchanger assembly 26 to transfer heat from flue gases to a fluid (not shown) to facilitate heating the fluid. In one embodiment, the heated fluid may generate steam that may be used to generate power using known power generation methods and systems such as, for example, a steam turbine (not shown). Alternatively, heat exchanger assembly 26 may transfer heat from flue gases to a fuel cell (not shown) used to generate power. The resulting power may be supplied to a power grid (not shown). In the exemplary embodiment, convective pass 27 channels flue gases from combustion assembly 18 towards particulate filter assembly 14 for removing particulate from flue gases before being discharged from stack 16.

In the exemplary embodiment, power generation system 10 includes a plurality of acoustic cleaning assemblies 28 that are coupled to furnace 12, particulate filter assembly 14, and/or stack 16 to facilitate removing debris and/or filtered pollution constituents from furnace 12, particulate filter assembly 14, and/or stack 16. Acoustic cleaning assembly 28 generates sound waves that facilitate the removal of debris and/or filtered pollution constituents from filters, filtration equipment, and/or emission control components.

Figure 2:
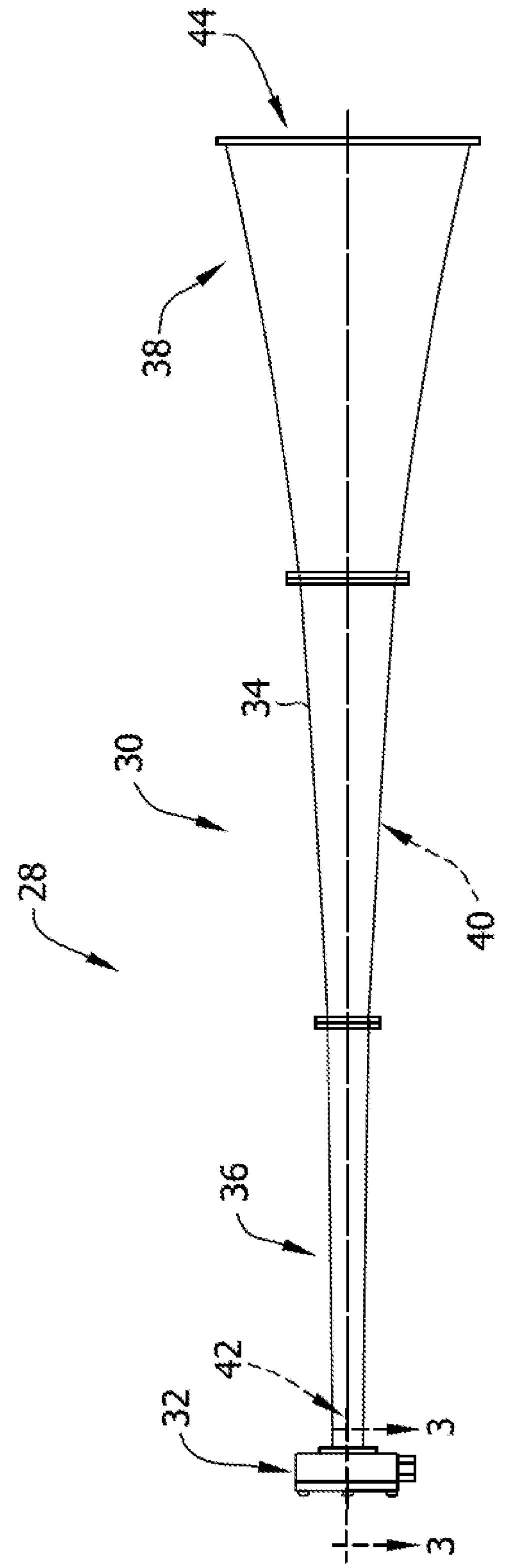
FIG. 2 is a perspective view of an exemplary acoustic cleaning assembly that may be used with the power generation system shown in FIG. 1.
Figure 3:
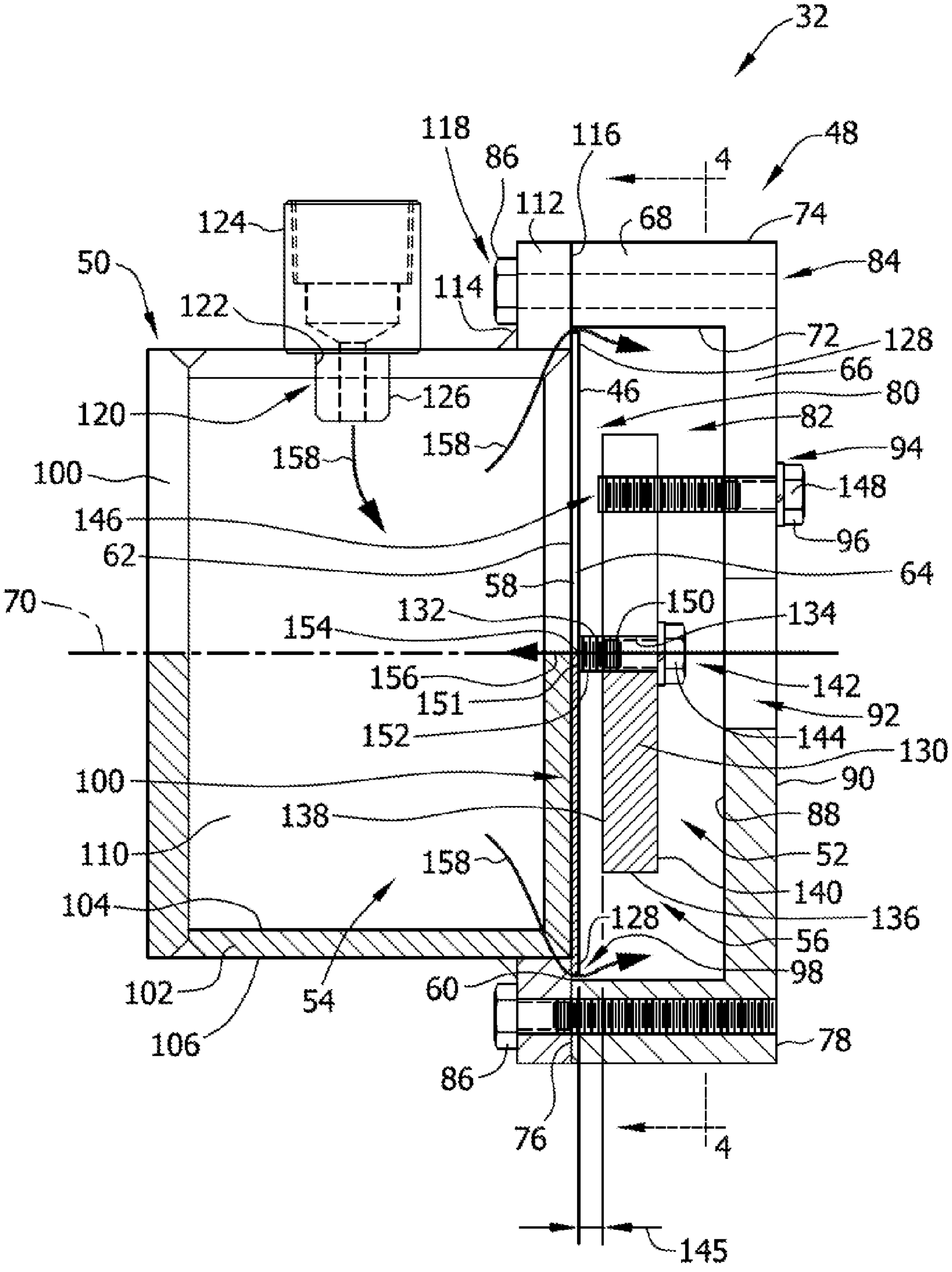
FIG. 3 is a cross-sectional view of the acoustic cleaning assembly shown in FIG. 2 and taken along line 3-3.
Figure 4:
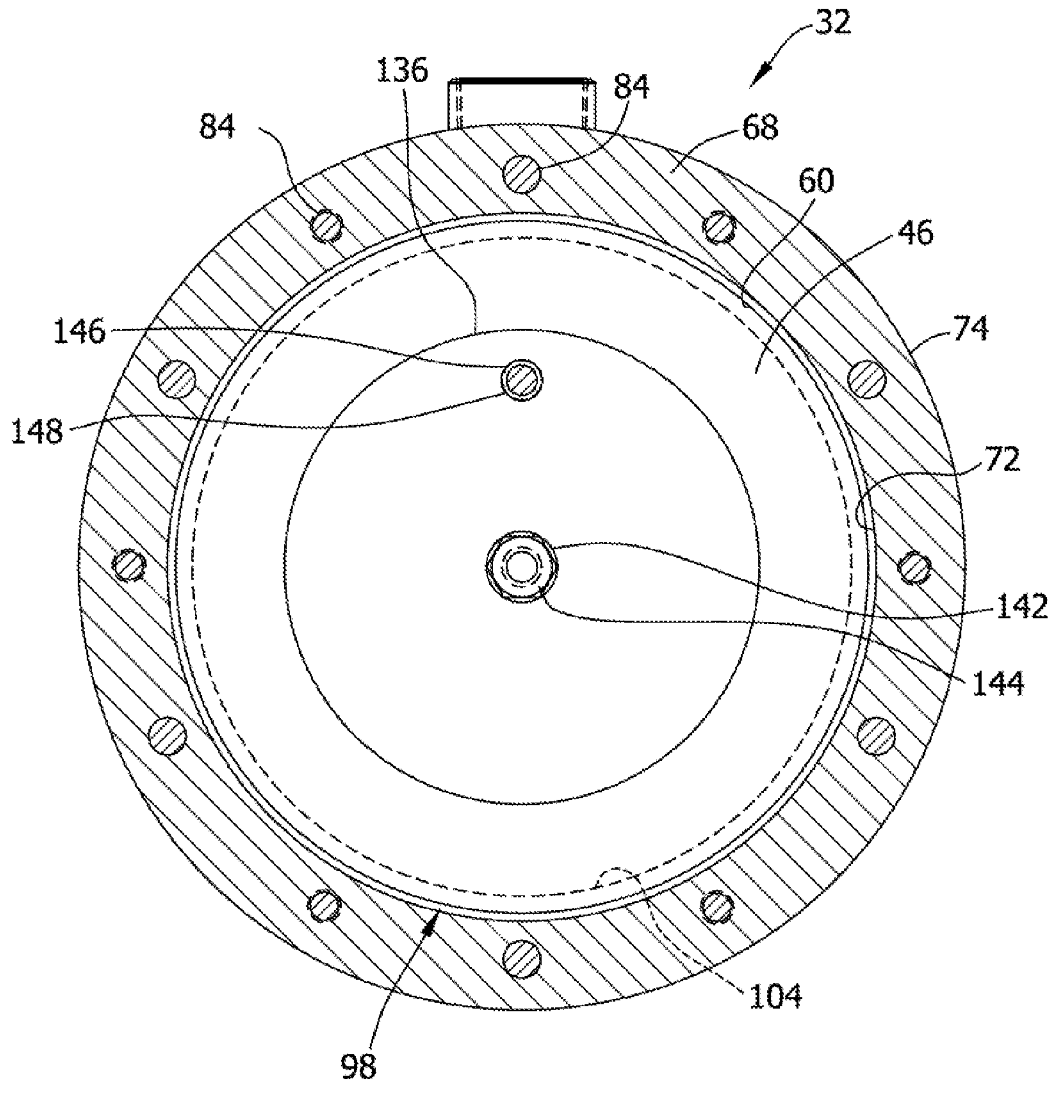
FIG. 4 is a cross-sectional view of the acoustic cleaning assembly shown in FIG. 3 and taken along line 4-4.
Figure 5:
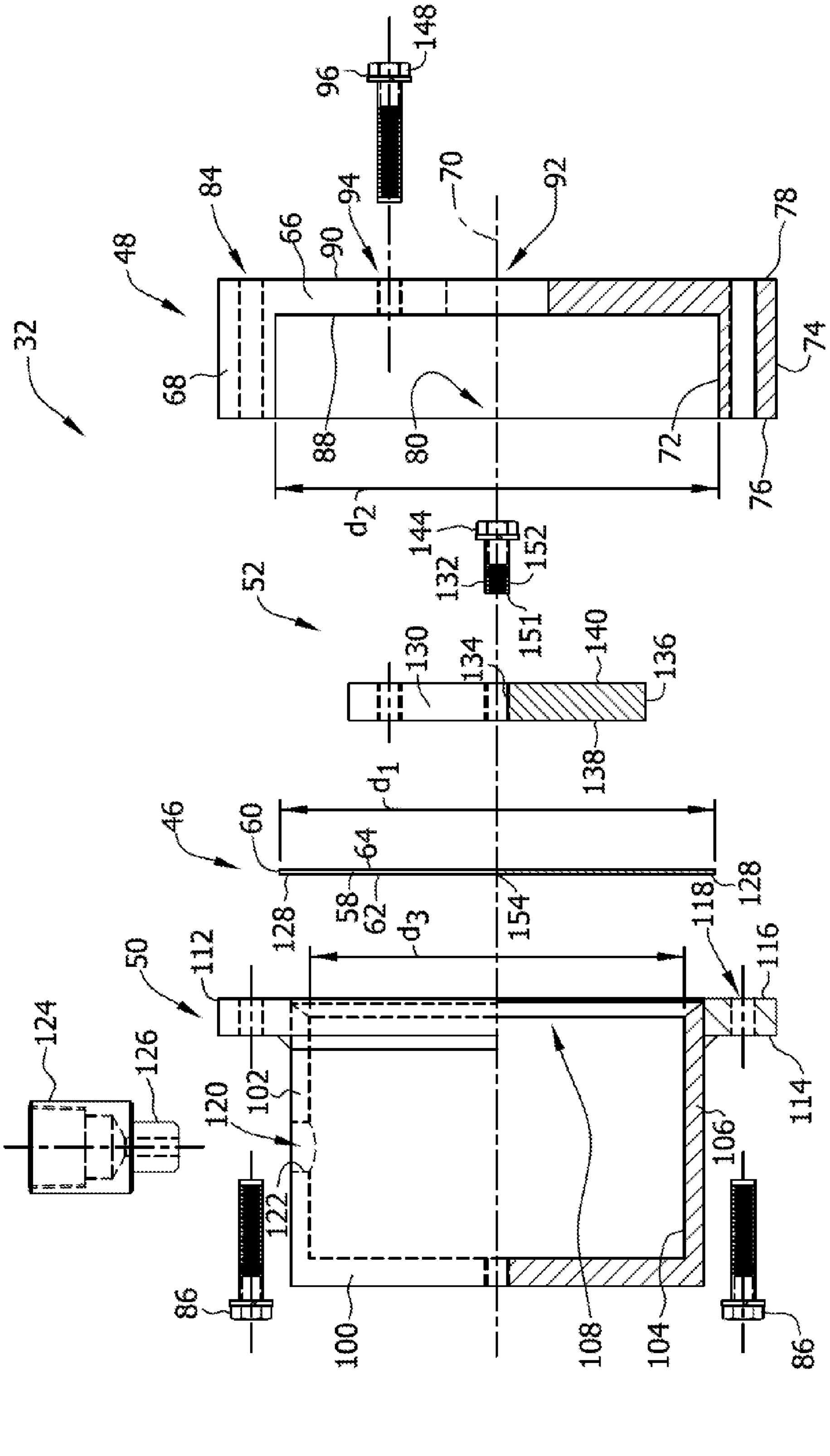
FIG. 5 is an exploded cross-sectional view of the acoustic cleaning assembly shown in FIG. 3.

FIG. 2 is a perspective view of acoustic cleaning assembly 28. FIG. 3 is a cross-sectional view of acoustic cleaning assembly 28 taken along line 3-3. FIG. 4 is a cross-sectional view of acoustic cleaning assembly 28 taken along line 4-4. FIG. 5 is an exploded cross-sectional view of acoustic cleaning assembly 28. Identical components shown in FIGS. 3-5 are identified using the same reference numbers used in FIG. 2. In the exemplary embodiment, acoustic cleaning assembly 28 includes a horn assembly 30 that is coupled in acoustic communication to a sound generator 32. Horn assembly 30 includes an acoustic horn 34 that extends between a throat region 36 and a mouth region 38. Acoustic horn 34 has an inner surface 40 that defines a first opening 42 at throat region 36 and a second opening 44 at mouth region 38. Acoustic horn 34 is coupled to sound generator 32 at throat region 36, and has a predefined shape that facilitates increasing the acoustic output of sound generator 32. In various embodiments, such a predefined shape may be, but is not limited to, a cone, an exponential, or a tractrix.

In the exemplary embodiment, acoustic horn 34 is sized and shaped to convert large pressure variations with a small displacement in throat region 36 into a low pressure variation with a large displacement in mouth region 38 and vice-versa using a gradual increase of the cross sectional area of horn 34. The small cross-sectional area of throat region 36 restricts the passage of air thus presenting a high impedance to sound generator 32. More specifically, the cross-sectional shape of horn 34, enables sound generator 32 to develop a high pressure for a given displacement. As such, the sound waves generated at throat region 36 are of high pressure and low displacement. Moreover, the tapered shape of horn 34 enables the sound waves to gradually decompress and increase in displacement until those waves travel to mouth region 38 where they are of a low pressure and large displacement.

Referring to FIGS. 3-5, in the exemplary embodiment, sound generator 32 includes a diaphragm 46, a generator body 48, an end cap 50, and a support assembly 52. Diaphragm 46 is positioned between generator body 48 and end cap 50 such that an inlet plenum 54 is defined that extends between end cap 50 and diaphragm 46, and such that an outlet plenum 56 is defined that extends between diaphragm 46 and generator body 48. In the exemplary embodiment, diaphragm 46 includes a disk-shaped body 58 that includes a radially outer surface 60 that extends generally axially between an upstream surface 62 and a downstream surface 64. Body 58 is formed with a first diameter $d_1$.

Generator body 48 includes an endwall 66 and a substantially cylindrical sidewall 68 that extends outwardly from endwall 66. A centerline axis 70 extends through body 48. Sidewall 68 includes a radially inner surface 72 and a radially outer surface 74, and extends generally axially between a forward surface 76 and an aft surface 78. Inner surface 72 has a substantially cylindrical shape that defines a first open end 80 and a cavity 82 that extends between first open end 80 and endwall 66. A plurality of openings 84 are formed within sidewall 68. Each opening 84 is oriented substantially parallel to centerline axis 70 and each opening 84 extends between forward surface 76 and aft surface 78. Moreover, each opening 84 is sized and shaped to receive a fastener 86 therethrough.

In the exemplary embodiment, endwall 66 is coupled to sidewall 68 and is oriented substantially perpendicularly to centerline axis 70. Endwall 66 includes an inner surface 88 and an outer surface 90. A first opening 92 defined is endwall 66 extends from inner surface 88 to outer surface 90. First opening 92 is sized and shaped to provide flow communication between cavity 82 and throat region 36 of horn 34, and is oriented to channel sound waves from outlet plenum 56 to horn 34 to facilitate cleaning of components. In the exemplary embodiment, first opening 92 has a substantially cylindrical shape and is oriented substantially coaxially with centerline axis 70. Alternatively, first opening 92 may have any suitable shape and may be defined at any suitable location within endwall 66 that enables acoustic cleaning assembly 28 to function as described herein. In the exemplary embodiment, endwall 66 defines a second opening 94 that extends between inner surface 88 and outer surface 90. Second opening 94 is sized and shaped to received a fastener 96 therethrough.

In the exemplary embodiment, generator body end 80 has a second diameter $d_2$ that is larger than first diameter $d_1$ of diaphragm 46. Diaphragm 46 is positioned within cavity 82 such that inner surface 72 of first open end 80 substantially circumscribes diaphragm radially outer surface 60. Diaphragm 46 is oriented with respect to generator body 48 such that a gap 98 is defined between radially outer surface 60 and inner surface 72. Outlet plenum 56 is at least partially defined by diaphragm downstream surface 64 and body inner surface 72.

In the exemplary embodiment, end cap 50 includes a base member 100 and a substantially cylindrical sidewall 102 that extends outwardly from base member 100. Sidewall 102 has an inner surface 104 and an outer surface 106. Inner surface 104 has a substantially cylindrical shape that defines a second open end 108 and a cavity 110 that extends between second open end 108 and base member 100. Second open end 108 has a third diameter, $d_3$. A flange 112 extends circumferentially about outer surface 106 and is oriented substantially perpendicular to centerline axis 70. More specifically, flange 112 extends generally axially between an upstream wall 114 and an opposite downstream wall 116, and defines a plurality of openings 118 that each extend between upstream wall 114 and downstream wall 116. Each opening 118 is sized, shaped, and oriented to receive respective fastener 86 therethrough to secure end cap 50 to generator body 48.

An inlet opening 120 is defined by a threaded interior surface 122 that extends between sidewall inner surface 104 and outer surface 106. Opening 120 is sized and shaped to receive an air inlet assembly 124 therein. Air inlet assembly 124 includes a threaded outer surface 126 and is inserted through opening 120 such that threaded outer surface 126 cooperates with threaded interior surface 122. Air inlet assembly 124 channels pressurized air from an air source (not shown) into cavity 110.

In the exemplary embodiment, diaphragm first diameter $d_1$ is larger than third diameter, $d_3$ of second open end 108. Diaphragm 46 is positioned with respect to end cap 50 such that diaphragm 46 substantially covers second open end 108 to define inlet plenum 54 between upstream surface 62 of diaphragm 46 and inner surface 104 of end cap 50. An outer portion 128 of upstream surface 62 is positioned adjacent to flange downstream wall 116.

In the exemplary embodiment, support assembly 52 includes a support plate 130 and at least one fasteners 132. Support plate 130 is positioned within outlet plenum 56 between diaphragm 46 and generator body endwall 66. Support plate 130 includes a radially inner surface 134, a radially outer surface 136, an upstream surface 138, and an opposite downstream surface 140. Upstream and downstream surfaces 138 and 140, respectively, each extend between radially inner surface 134 and radially outer surface 136. Radially inner surface 134 defines a first opening 142 that extends between upstream surface 138 and downstream surface 140. First opening 142 is oriented with respect to centerline axis 70, and is sized and shaped to receive a first fastener 144 therethrough. At least a portion of first fastener 144 extends a distance 145 from upstream surface 138 towards diaphragm 46 along centerline axis 70. Similarly, support plate 130 defines a second opening 146 that extends between upstream surface 138 and downstream surface 140. In the exemplary embodiment, opening 146 is oriented substantially concentrically with respect to generator body second opening 94. Openings 94 and 146 are sized and shaped to receive a second fastener 148 therethrough for coupling support plate 130 to generator body 48 such that support plate 130 is supported from generator body 48.

In the exemplary embodiment, opening 142 includes a threaded interior surface 150 that extends between upstream surface 138 and downstream surface 140. A tip portion 151 of fastener 144 is formed with a threaded outer surface 152 that is inserted through opening 142 such that threaded outer surface 152 cooperates with threaded interior surface 150. Fastener 144 contacts diaphragm downstream surface 64 at a center portion 154 to bias diaphragm 46 towards end cap 50 such that outer portion 128 of upstream surface 62 contacts flange 112.

During operation of sound generator 32, air inlet assembly 124 channels pressurized air 158 through inlet plenum 54 towards diaphragm 46. Support assembly 52 imparts force 156 to diaphragm 46 along centerline axis 70 to bias diaphragm 46 towards end cap 50, such that outer portion 128 of upstream surface 62 contacts flange 112. Diaphragm 46 is oriented to channel air 158 from inlet plenum 54 into outlet plenum 56 and across radially outer surface 60. As air 158 is channeled across radially outer surface 60, air 158 causes diaphragm 46 to vibrate against flange 112 to facilitate generating sound waves within outlet plenum 56. Generator body opening 92 channels the sound waves from outlet plenum 56 towards horn throat region 36.

Figure 6:
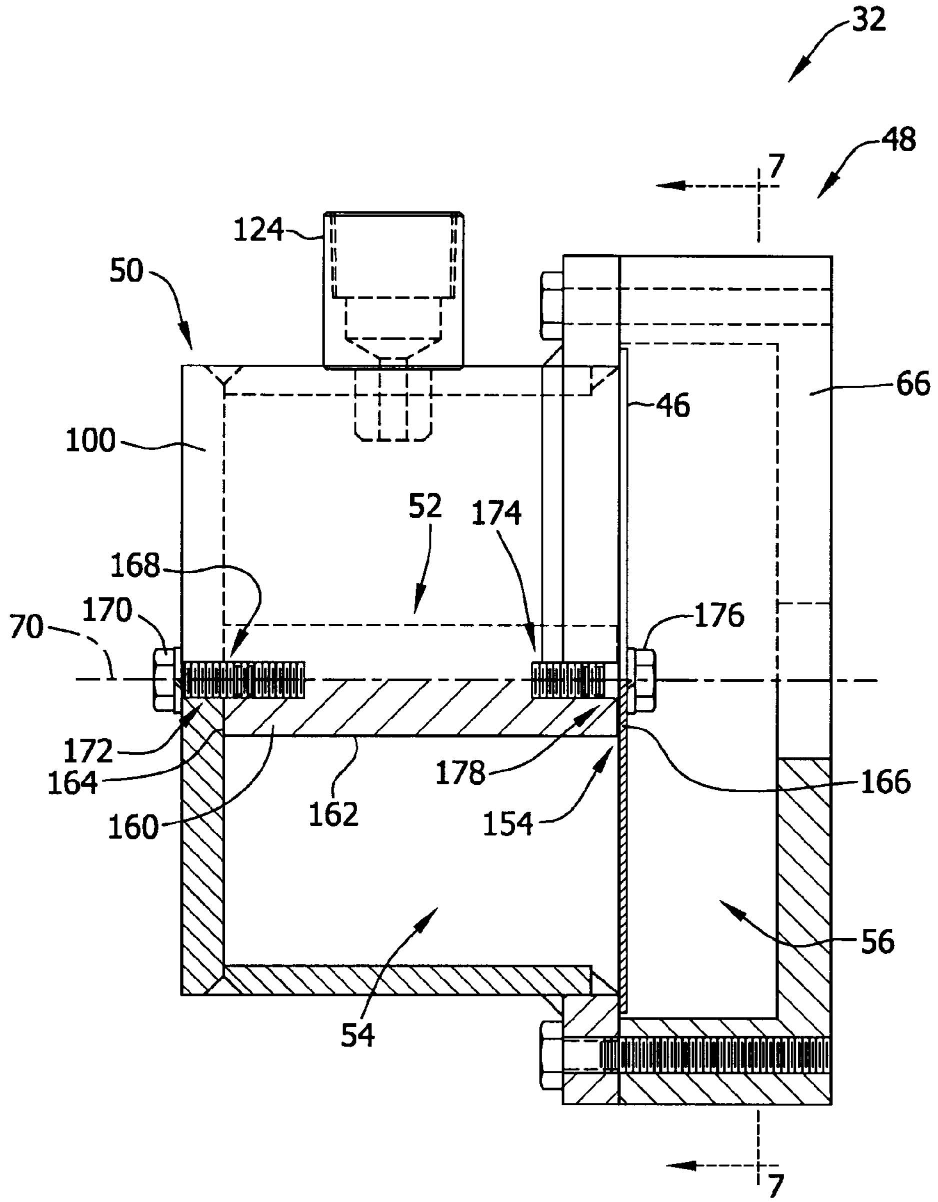
FIG. 6 is a cross-sectional view of an alternative sound generator that may be used with the acoustic cleaning assembly shown in FIG. 2.

FIG. 6 is a cross-sectional view of an alternative embodiment of sound generator 32. Identical components shown in FIG. 6 are identified with the same reference numbers used in FIG. 3. In the exemplary embodiment, support assembly 52 includes a support bar 160 that is positioned within inlet plenum 54 and that is coupled between end cap 50 and diaphragm 46. Support bar 160 has a substantially cylindrical shape and is oriented along centerline axis 70. Support bar 160 includes a radially outer surface 162 that extends between a first endwall 164 and an axially-spaced second endwall 166 along centerline axis 70. First endwall 164 defines a first bore 168 that extends along centerline axis 70 and is sized and shaped to receive a first fastener 170 therein. Base member 100 of end cap 50 defines a cooperative opening 172 that is oriented coaxially with first bore 168. First fastener 170 is inserted through cooperative opening 172 and through bore 168 to couple support bar 160 to end cap 50. Second endwall 166 defines a second bore 174 that extends along centerline axis 70 and is sized to receive a second fastener 176 therein. Center portion 154 of diaphragm 46 defines an opening 178 that extends between upstream surface 62 and downstream surface 64 and is oriented coaxially with second bore 174. Second fastener 176 is inserted through opening 178 and through bore 174 to coupled diaphragm 46 to support bar 160. Fastener 176 biases diaphragm 46 towards end cap 50 such that outer portion 128 contacts flange 112 to facilitate channeling air from inlet plenum 54 to outlet plenum 56 across radially outer surface 60 of diaphragm 46.

Figure 7:
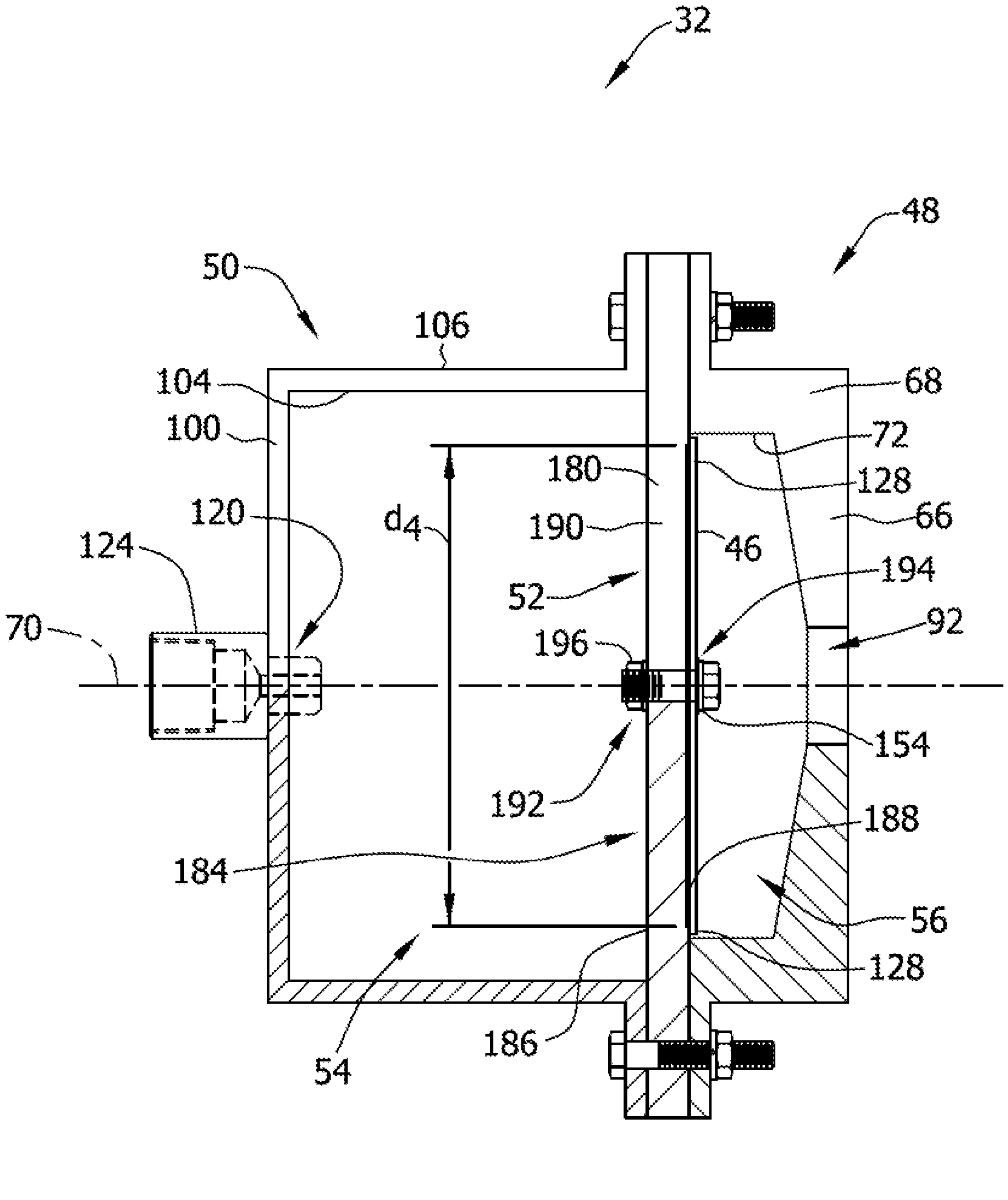
FIG. 7 is a cross-sectional view of another alternative sound generator that may be used with the acoustic cleaning assembly shown in FIG. 2.
Figure 8:
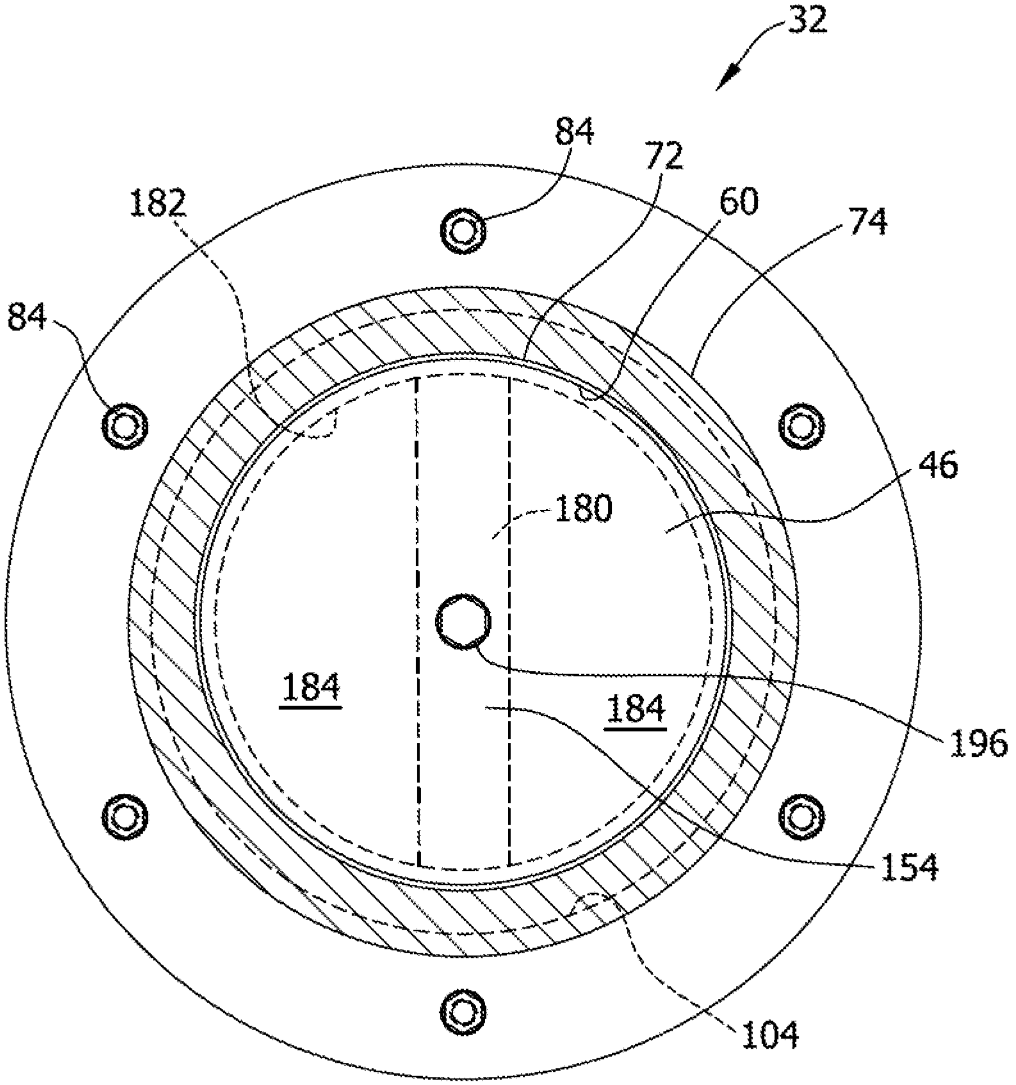
FIG. 8 is a cross-sectional view of the alternative sound generator shown in FIG. 7 and taken along line 8-8.

FIG. 7 is a cross-sectional view of another alternative embodiment of sound generator 32 shown in FIG. 3. FIG. 8 is a cross-sectional view of sound generator 32 shown in FIG. 7 taken along line 8-8. Identical components shown in FIG. 7 and FIG. 8 are labeled with the same reference numbers used in FIG. 3. In an alternative embodiment, support assembly 52 includes an annular support member 180 that is coupled between end cap 50 and generator body 48. Support member 180 includes an inner surface 182 that defines a substantially cylindrical cavity 184 that extends between an upstream surface 186 and a downstream surface 188. Support member 180 has a fourth diameter $d_4$ that is defined by inner surface 182. Forth diameter $d_4$ is smaller than first diameter $d_1$ of diaphragm 46. Support member 180 includes a support flange 190 that extends from inner surface 182 and across cavity 184. Support flange 190 defines an opening 192 that is oriented about centerline axis 70. Diaphragm 46 is positioned adjacent downstream surface 188 of support member 180, and defines a cooperative opening 194 that extends through center portion 154 and is oriented coaxially with opening 192 of support flange 190. A fastener 196 is inserted though openings 192 and 194 to coupled diaphragm 46 to support flange 190 and to bias diaphragm 46 towards support member 180 such that outer portion 128 of diaphragm 46 contacts downstream surface 188. In this embodiment, base member 100 of end cap 50 defines inlet opening 120. Air inlet assembly 124 is inserted through opening 120 and is oriented with respect to centerline axis 70.

Figure 9:
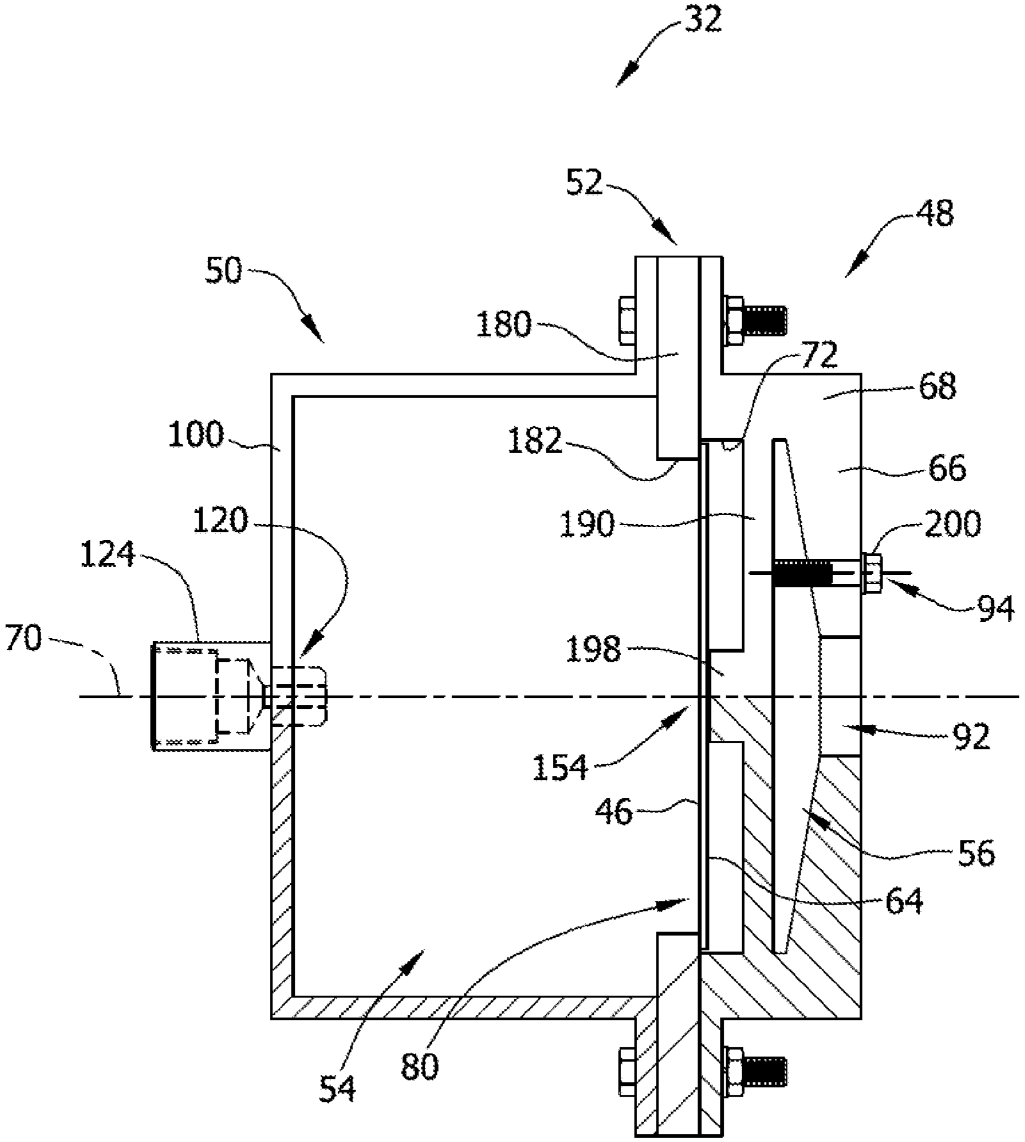
FIG. 9 is a cross-sectional view of another alternative sound generator that may be used with the acoustic cleaning assembly shown in FIG. 2.

FIG. 9 is a cross-sectional view of another alternative embodiment of sound generator 32 shown in FIG. 7. Identical components shown in FIG. 9 are identified with the same reference numbers used in FIG. 7. In this embodiment, support flange 190 is coupled to inner surface 72 of generator body 48 and extends across first open end 80. Support flange 190 is positioned within outlet plenum 56 and is oriented substantially perpendicular to centerline axis 70. Support flange 190 includes a projection 198 that extends outwardly from support flange 190 towards downstream surface 64 of diaphragm 46 along centerline axis 70. Projection 198 contacts center portion 154 of diaphragm 46 to bias diaphragm 46 towards end cap 50. A fastener 200 is inserted through second opening 94 of generator body 48 and extends towards support flange 190. Fastener 200 contacts support flange 190 to bias support flange 190 towards diaphragm 46.

The above-described systems and methods overcome at least some disadvantages of known acoustic cleaning assemblies by providing an acoustic cleaning assembly that includes a diaphragm positioned between an inlet plenum and an outlet plenum such that pressurized air is channeled across an outer surface of the diaphragm. In addition, a support assembly is positioned within the inlet plenum and/or the outlet plenum, and is coupled to the diaphragm to support the diaphragm within a cavity of the acoustic cleaning assembly. By positioning the diaphragm between the inlet plenum and the outlet plenum, substantially all of the air channeled into the inlet plenum is channeled to the outlet plenum and across the diaphragm, thus reducing the amount of pressurized air required to clean air treatment components over known acoustic cleaning assemblies and reducing the cost of operating the acoustic cleaner.

Exemplary embodiments of systems and methods for assembling an acoustic cleaning assembly are described above in detail. The systems and methods are not limited to the specific embodiments described herein, but rather, components of systems and/or steps of the method may be utilized independently and separately from other components and/or steps described herein. For example, the systems and method may also be used in combination with other air treatment systems and methods, and are not limited to practice with only the turbine engine system as described herein. Rather, the exemplary embodiment can be implemented and utilized in connection with many other combustion system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An acoustic cleaning assembly comprising:
- a horn assembly;
- a generator body coupled to said horn assembly, said generator body comprising an inner surface that at least partially defines an outlet plenum, and an opening that extends in flow communication between said horn assembly and said outlet plenum;
- an end cap coupled to said generator body and comprising an inner surface that at least partially defines an inlet plenum; and
- a diaphragm coupled between said generator body and said end cap, said diaphragm comprising an upstream surface defining said inlet plenum and an opposite downstream surface defining said outlet plenum, said diaphragm channels air from said inlet plenum to said outlet plenum to facilitate generating sound waves within said outlet plenum, wherein said downstream surface faces said horn assembly.

2. An acoustic cleaning assembly in accordance with claim 1, further comprising a support assembly coupled to said diaphragm and to one of said end cap and said generator body.

3. An acoustic cleaning assembly in accordance with claim 2, wherein said end cap comprises a sidewall extending outwardly from an endwall, said support assembly comprises a support bar coupled between said endwall and said upstream surface of said diaphragm.

4. An acoustic cleaning assembly in accordance with claim 2, wherein said support assembly comprises:
- a support member coupled between said generator body and said end cap, said support member comprising an inner surface that at least partially defines said inlet plenum; and
- a support flange coupled to said inner surface of said support member and extending across said inlet plenum, said support flange coupled to said diaphragm to support said diaphragm from said support assembly.

5. An acoustic cleaning assembly in accordance with claim 2, wherein said support assembly comprises:
- a support member coupled between said generator body and said end cap, said support member comprising an inner surface that at least partially defines said inlet plenum; and
- a support flange coupled to said inner surface of said generator body and extending across said outlet plenum, said support flange comprising a projection positioned adjacent to a center portion of said diaphragm for biasing said diaphram towards said support member.

6. An acoustic cleaning assembly in accordance with claim 2, wherein said support assembly comprises:
- a support plate positioned within said outlet plenum;
- a first fastener coupled between said support plate and said generator body; and
- a second fastener coupled between said support plate and said diaphragm.

7. A power generation system comprising:

a combustion assembly for generating combustion gases;

a particulate filter assembly coupled to said combustion assembly for removing particulate from the combustion gases; and at least one acoustic cleaning assembly coupled to said particulate filter assembly to facilitate removing debris from said particulate filter assembly, said acoustic cleaning assembly comprising:

a horn assembly;

a generator body coupled to said horn assembly, said generator body comprising an inner surface that at least partially defines an outlet plenum, and an opening that extends in flow communication between said horn assembly and said outlet plenum;

an end cap coupled to said generator body and comprising an inner surface that at least partially defines an inlet plenum;

a diaphragm coupled between said generator body and said end cap, said diaphragm comprising an upstream surface defining said inlet plenum and an opposite downstream surface defining said outlet plenum, said diaphragm channels air from said inlet plenum to said outlet plenum to facilitate generating sound waves within said outlet plenum; wherein said downstream surface faces said horn assembly.

8. A power generation system in accordance with claim 7, further comprising a support assembly coupled to said diaphragm and to one of said end cap and said generator body.

9. A power generation system in accordance with claim 8, wherein said end cap comprises a sidewall extending outwardly from an endwall, said support assembly comprises a support bar coupled between said endwall and said upstream surface of said diaphragm.

10. A power generation system in accordance with claim 8, wherein said support assembly comprises:

a support member coupled between said generator body and said end cap, said support member comprising an inner surface that at least partially defines said inlet plenum; and a support flange coupled to said inner surface of said support member and extending across said inlet plenum, said support flange coupled to said diaphragm to support said diaphragm from said support assembly.

11. A power generation system in accordance with claim 8, wherein said support assembly comprises:

a support member coupled between said generator body and said end cap, said support member comprising an inner surface that at least partially defines said inlet plenum; and a support flange coupled to said inner surface of said generator body and extending across said outlet plenum, said support flange comprising a projection positioned adjacent to a center portion of said diaphragm for biasing said diaphram towards said support member.

12. A power generation system in accordance with claim 8, wherein said support assembly comprises:

a support plate positioned within said outlet plenum;

a first fastener coupled between said support plate and said generator body; and a second fastener coupled between said support plate and said diaphragm.

13. A method of assembling an acoustic cleaning assembly, said method comprising:

providing a horn assembly;

coupling a generator body to the horn assembly, the generator body including an inner surface that at least partially defines an outlet plenum, and an outlet opening that extends in flow communication between the horn assembly and the outlet plenum;

coupling an end cap to the generator body, the end cap including an inner surface that at least partially defines an inlet plenum; and coupling a diaphragm between the generator body and the end cap, the diaphragm including an upstream surface and an opposite downstream surface, the diaphragm oriented to enable a flow of air to be channeled from the inlet plenum to the outlet plenum to facilitate generating sound waves within the outlet plenum, wherein said downstream surface faces said horn assembly.

14. A method in accordance with claim 13, further comprising coupling a support assembly to the diaphragm and to one of the end cap and the generator body.

15. A method in accordance with claim 14, further comprising coupling a support bar between an inner surface of the end cap and the upstream surface of the diaphragm, the support bar extending between the end cap and the diaphragm along the centerline axis.

16. A method in accordance with claim 14, further comprising:

coupling a support member between the generator body and the end cap, that support member having an inner surface that at least partially defines the inlet plenum;

coupling a support flange to the inner surface of the support member, the support flange oriented substantially perpendicular to the centerline axis and extending across the inlet plenum; and coupling the upstream surface of the diaphragm to the support flange.

17. A method in accordance with claim 14, further comprising:

coupling a support member between the generator body and the end cap, that support member having an inner surface that at least partially defines the inlet plenum;

coupling a support flange to an inner surface of the generator body, the support flange oriented substantially perpendicular to the centerline axis and extending across the outlet plenum, the support flange including a projection that is positioned adjacent the diaphragm.

18. A method in accordance with claim 14, further comprising:

positioning a support plate within the outlet plenum;

coupling a first fastener between the support plate and the generator body; and coupling a second fastener between the support plate and the downstream surface of the diaphragm.

* * * * *